United States Patent
Firsich et al.

(10) Patent No.: US 11,739,709 B1
(45) Date of Patent: Aug. 29, 2023

(54) PDI VOLUMETRIC EFFICIENCY PASTING

(71) Applicants: Nicholas Firsich, Clarkston, MI (US); Alex Eskenazi-Gold, Ferndale, MI (US); David R Pedro, Troy, MI (US); William P Attard, Brighton, MI (US); Joseph D Falcon, Clawson, MI (US)

(72) Inventors: Nicholas Firsich, Clarkston, MI (US); Alex Eskenazi-Gold, Ferndale, MI (US); David R Pedro, Troy, MI (US); William P Attard, Brighton, MI (US); Joseph D Falcon, Clawson, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 17/881,071

(22) Filed: Aug. 4, 2022

(51) Int. Cl.
*F02D 41/30* (2006.01)
*F02D 41/24* (2006.01)
*F02D 41/00* (2006.01)
*F02D 41/14* (2006.01)

(52) U.S. Cl.
CPC ..... *F02D 41/3094* (2013.01); *F02D 41/0032* (2013.01); *F02D 41/1401* (2013.01); *F02D 41/2416* (2013.01); *F02D 41/2422* (2013.01); *F02D 41/2467* (2013.01); *F02D 41/2487* (2013.01); *F02D 2041/1429* (2013.01); *F02D 2200/0614* (2013.01)

(58) Field of Classification Search
CPC ............. F02D 41/0032; F02D 41/1401; F02D 41/2416; F02D 41/2422; F02D 41/2467; F02D 41/2487; F02D 41/3094; F02D 41/402–405; F02D 2041/1429; F02D 2200/0614; F02D 19/0689; F02D 19/0692; F02D 19/0694
See application file for complete search history.

(56) References Cited

U.S. PATENT DOCUMENTS

| 7,150,266 | B2 | 12/2006 | Nakayama et al. |
| 9,702,315 | B1 | 7/2017 | Palmer |
| 9,885,309 | B1 | 2/2018 | Hollar et al. |
| 10,669,956 | B2 * | 6/2020 | Dane ................. F02M 21/0209 |

(Continued)

FOREIGN PATENT DOCUMENTS

| CN | 112304159 A | 2/2021 |
| JP | 2009281328 A | 12/2009 |

(Continued)

*Primary Examiner* — Hung Q Nguyen
*Assistant Examiner* — Mark L. Greene
(74) *Attorney, Agent, or Firm* — Jeremy J. Klobucar

(57) ABSTRACT

A port and direct fuel injection (PDI) fuel delivery system for a vehicle having an engine configured to selectively operate between a port fuel injection (PFI) mode, a gasoline direct injection (GDI) mode, and a PDI mode includes a PFI system including plurality of PFI injectors, and a GDI system including a plurality of GDI injectors. The PFI and GDI systems are configured to provide various split-ratios of fuel mass injection to the engine based on a particular engine operating condition. A controller is programmed to identify a known first long term fuel trim (LTFT) for a first split-ratio, identify a known second LTFT for a second split-ratio, generate a linear equation based on the known first and second LTFTs, and determine an unknown third LTFT for a third split-ratio by utilizing the linear equation to facilitate reducing fueling errors and emissions.

16 Claims, 4 Drawing Sheets

(56) References Cited

U.S. PATENT DOCUMENTS

| | | |
|---|---|---|
| 10,823,101 B1 | 11/2020 | Gwidt et al. |
| 10,900,432 B2 | 1/2021 | Sanborn et al. |
| 11,319,890 B2 | 5/2022 | Wakao et al. |
| 2009/0198434 A1 | 8/2009 | Tanaka et al. |
| 2009/0216429 A1 | 8/2009 | Yamashita et al. |
| 2012/0247422 A1 | 10/2012 | Nagakura |
| 2012/0297866 A1 | 11/2012 | Tanaka et al. |
| 2016/0131072 A1 | 5/2016 | Surnilla et al. |
| 2018/0051647 A1 | 2/2018 | Ranga et al. |

FOREIGN PATENT DOCUMENTS

| | | |
|---|---|---|
| JP | 2012172527 A | 9/2012 |
| JP | 2014013032 A | 1/2014 |
| WO | 2014020393 A1 | 2/2014 |

\* cited by examiner

PDI VOLUMETRIC EFFICIENCY PASTING

FIELD

The present application relates generally to internal combustion engines and, more particularly, to systems and methods for predicting long term fuel trim of an engine having a port and direct fuel injection system.

BACKGROUND

Internal combustion engines have traditionally utilized port fuel injection (PFI) fuel delivery technology. PFI engines mix fuel and air in an intake port before the mixture is drawn into the engine cylinders for combustion. This mixing is performed to optimize the combustion and improve engine performance. More recently, gasoline direct injection (GDI) fuel delivery technology has been introduced to provide improved fuel economy. GDI engines draw air into the cylinder during the intake stroke, and fuel is injected directly into the cylinders during the intake or compression stroke to mix with the air. This type of mixing potentially provides improved fuel economy and engine performance under various load conditions. However, both PFI and GDI engines have their own unique advantages and disadvantages when compared to each other.

In an attempt to utilize the advantages of both systems, some engines include both port and direct fuel injection (PDI) fuel delivery systems. Conventional fuel adaption strategies have been utilized to minimize fueling errors. However, when utilizing a PDI system, errors learned while running in one fueling mode (PFI or GDI) may not be anywhere near the error for the other mode. This can potentially lead to inaccurate long term fuel trims, which can potentially negatively impact emissions, particularly while trying to run purge. Thus, while such systems work well for their intended purpose, it is desirable to provide continuous improvement in the relevant art.

SUMMARY

According to one example aspect of the invention, a port and direct fuel injection (PDI) fuel delivery system for a vehicle having an engine configured to selectively operate between a port fuel injection (PFI) mode, a gasoline direct injection (GDI) mode, and a PDI mode is provided. In one exemplary implementation, the PDI fuel delivery system includes a PFI system including plurality of PFI injectors configured to supply fuel to the engine during the PFI mode, and a GDI system including a plurality of GDI injectors configured to supply fuel to the engine during the GDI mode. The PFI system and the GDI system are configured to provide various split-ratios of fuel mass injection to the engine based on a particular engine operating condition, the split-ratio being a ratio of fuel mass injection of the PFI injectors to fuel mass injection of the GDI injectors. A controller is programmed to identify a known first long term fuel trim (LTFT) for a first split-ratio, identify a known second LTFT for a second split-ratio, generate a linear equation based on the known first and second LTFTs, and determine an unknown third LTFT for a third split-ratio by utilizing the linear equation to thereby facilitate reducing fueling errors and emissions.

In addition to the foregoing, the described system may include one or more of the following features: wherein the linear equation is LTFT=(Slope*Split-Ratio)+Offset, wherein the Slope and Offset are determined from the known first and second LTFTs and first and second split-ratios; wherein the controller includes or is configured to reference a table indexing the various split-ratios of the PDI fuel delivery system for the particular engine operating condition; wherein the controller is configured to paste the determined third LTFT into the table as a known third LTFT at the third split-ratio; and wherein the controller is configured to determine all unknown LTFTs in the table and paste the determined LTFTs into the table in corresponding split-ratio data cells.

In addition to the foregoing, the described system may include one or more of the following features: wherein the table includes a plurality of regions each corresponding to a particular split-ratio; wherein the known first LTFT is a learned LTFT that is established when the sustained error from a first short term fuel trim (STFT) for the first split-ratio is transferred to the first LTFT such that the first STFT is brought back to a nominal value; and an EVAP system configured to store and subsequently dispose of fuel vapor emissions, wherein the controller is configured to operate the EVAP system based on the determined third LTFT.

According to another example aspect of the invention, a method of controlling a port and direct fuel injection (PDI) fuel delivery system for an engine having a port fuel injection (PFI) system and a gasoline direct injection (GDI) system, the engine configured to selectively operate between a PFI mode, a GDI mode, and a PDI mode is provided. The method includes, in one exemplary implementation, identifying, via a vehicle controller, a known first long term fuel trim (LTFT) for a first split-ratio; identifying, via the vehicle controller, a known second LTFT for a second split-ratio; generating, via the vehicle controller, a linear equation based on the known first and second LTFTs, and determining, via the vehicle controller, an unknown third LTFT for a third split-ratio by utilizing the linear equation to thereby facilitate reducing fueling errors and emissions.

In addition to the foregoing, the described method may include one or more of the following features: wherein the linear equation is LTFT=(Slope*Split-Ratio)+Offset, wherein the Slope and Offset are determined from the known first and second LTFTs and first and second split-ratios; referencing, via the controller, a table indexing the various split-ratios of the PDI fuel delivery system for the particular engine operating condition; pasting, via the controller, the determined third LTFT into the table as a known third LTFT at the third split-ratio; determining, via the controller, all unknown LTFTs in the table and pasting the determined LTFTs into the table in corresponding split-ratio data cells; wherein the table includes a plurality of regions each corresponding to a particular split-ratio; wherein the known first LTFT is a learned LTFT that is established when the sustained error from a first short term fuel trim (STFT) for the first split-ratio is transferred to the first LTFT such that the first STFT is brought back to a nominal value; and wherein the engine includes an EVAP system configured to store and subsequently dispose of fuel vapor emissions, wherein the vehicle controller is configured to operate the EVAP system based on the determined third LTFT.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present

DETAILED DESCRIPTION

Figure 1:
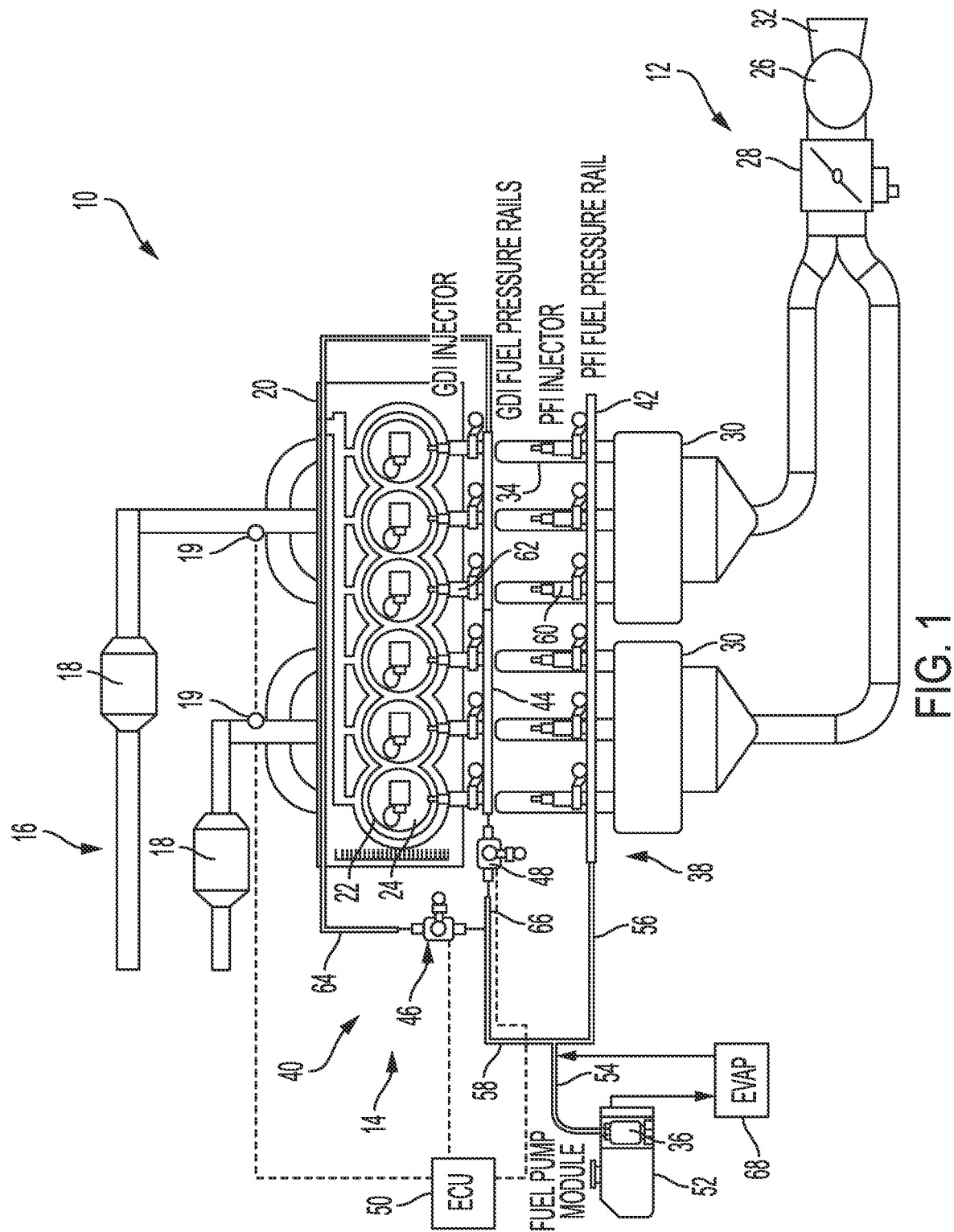
FIG. 1 is a schematic illustration of an engine and fuel delivery system in accordance with the principles of the present disclosure.

The present application is generally directed to a control system and strategy for an engine equipped with a port and direct fuel injection (PDI) system, which is configured to selectively operate between a port fuel injection (PFI) mode, a gasoline direct injection (GDI) mode, or a combination of both (PDI mode). The fuel delivery system changes operational modes to utilize the benefits of both PFI and GDI systems, for example, to reduce emissions and/or improve fuel economy. GDI system benefits include charge cooling/knock mitigation, combustion stability (EGR), lightoff/spark retard authority, burn duration reduction, and multiple injection events. PFI system benefits include fuel/air vaporization time (cold), reduced intake/valve deposits, particulate reduction, reduced risk of oil dilution, and quieter operation.

In the example embodiment, the control strategy is referred to as PDI volumetric efficiency (VE) "pasting" within the engine control unit (ECU) that allows long term fuel trim (LTFT) data cells to be "learned" (e.g., established) faster to reduce emissions for vehicles equipped with PDI. This fuel adaption strategy utilizes LTFTs and short term fuel trims (STFTs) to keep fueling errors at a minimum. The LTFTs are arranged into data cells that are indexed by engine speed and load. In one example, the short term fuel trim (STFT) is an instantaneous correction to the amount of fuel being delivered to the engine based on an error as indicated by one or more O2 sensors. The long term fuel trim (LTFT) is an accumulated correction of the amount of fuel being delivered to the engine. The LTFT may also be referred to as a volumetric efficiency correction that describes a correction to the airflow estimation model. The LTFT and the STFT work together to ensure the error in the amount of fuel delivered to the engine is at a minimum. The sum of the LTFT and STFT indicates a total fuel trim, or total system richness or leanness.

During operation, there are engine speeds/loads where the engine will operate with only the PFI system, only the GDI system, or a combination of both PFI and GDI systems (PDI mode). When operating in PDI mode, the system operates at various split-ratios, which are ratios of GDI to PFI fueling (or vice versa). As described herein in more detail, these split-ratios are indexed in a table by data cell IDs, and the data cells are populated and updated when a volumetric efficiency (or LTFT) is "learned" or established for that particular data cell.

Certain cell IDs will update or "learn" faster than others due to the way a vehicle is being driven. This is because the cells only update when the vehicle is operating in the conditions that correspond to that cell. Once a cell has updated, the system will label it as "learned." However, while some cells will update and "learn" quickly, others may not update at all. There may be cases in which it is desired that all the data cells be updated or "learned," but this is not possible to achieve during normal driving. Accordingly, the control strategy described herein utilizes information from the learned cells to paste values into the cells that are unlearned.

Fueling errors can occur in either the PFI or GDI fuel system of a PDI equipped vehicle. Therefore, information from both systems must be utilized when determining what fuel trim value to paste into the unlearned cells. There is an assumption that the fuel trim errors are caused by only the PFI and GDI fuel systems and that the resulting error can be modeled based on each system's contribution to total fueling. The pasting strategy for PDI equipped vehicles described herein utilizes a linear equation in which the LTFT to be pasted is a function of split-ratio.

To create the linear equation, two points are needed to calculate the slope and offset. Therefore, fuel trims from two different split-ratios with learned cells are used. This results in the equation LTFT=(slope*split-ratio)+offset. From here, the values to paste into an unlearned data cell can be obtained by inputting the split-ratio that corresponds to that unlearned data cell.

With initial reference to FIG. 1, an example internal combustion engine for a vehicle is illustrated and generally identified at reference numeral 10. The internal combustion engine 10 generally includes an air induction system 12, a fuel delivery system 14, and an exhaust system 16 having one or more catalytic converters 18 and O2 sensors 19.

The engine 10 further includes a cylinder head and block 20 defining one or more cylinders 22 each receiving a reciprocating piston (not shown) therein. Air and fuel are respectively supplied to combustion chambers 24 of the cylinders 22 via the air induction system 12 and the fuel delivery system 14. The air/fuel mixture is ignited in the combustion chamber 24 and the resulting combustion gas is directed from the chamber 24 to the exhaust system 16.

The air induction system 12 generally includes an air filter 26, a throttle control valve 28, and an intake manifold 30. Air enters the vehicle through an air intake 32 and is filtered in the air filter 26 before being delivered to intake ports 34 of the cylinders 22 for combustion therein.

In the example embodiment, the fuel delivery system 14 generally includes a low pressure fuel pump 36, a port fuel injection (PFI) fuel system 38, and a gasoline direct injection (GDI) fuel system 40. The PFI fuel system 38 includes a PFI fuel pressure rail 42 and a plurality of PFI injectors 60, and the GDI fuel system 40 includes a GDI fuel pressure rail 44, a plurality of GDI injectors 62, a first deactivating GDI fuel pump assembly 46, and a second deactivating GDI fuel pump assembly 48. In the example embodiment, the engine 10 includes a tri-function fuel delivery system 14 that is configured to be controlled by an engine control unit (ECU) 50 to selectively operate between a PFI mode, a GDI mode, or a combination of both (PDI mode), as described herein in more detail. In general, the engine is operated in the PFI mode during low engine load conditions or when charge motion is low, operated in the GDI mode when during high engine load conditions or where charge motion is high, and operated in PDI mode for other speed/load conditions.

The low pressure fuel pump 36 is disposed within a fuel tank 52 and is configured to supply fuel from the fuel tank 52 to a main fuel delivery line 54. As illustrated, the main fuel delivery line 54 supplies fuel to a PFI fuel delivery line 56 and a GDI fuel delivery line 58. The PFI fuel delivery line 56 is fluidly coupled to the PFI fuel pressure rail 42 to supply the fuel to the PFI injectors 60. In the example embodiment, PFI injectors 60 are configured to supply fuel to the intake ports 34 where the fuel is mixed with air from the air induction system 12 before being supplied to the combustion chambers 24.

The GDI fuel delivery line 58 is fluidly coupled to the GDI fuel pressure rail 44 to supply the fuel to the GDI injectors 62. In the example embodiment, GDI injectors 62 are configured to supply fuel directly to the cylinders 22 where the fuel is mixed with air from the air induction system 12 and combusted. Additionally, as shown in FIG. 1, GDI fuel delivery line 58 is split into a first GDI fuel supply line 64 and a second GDI fuel supply line 66 to supply. Each of the first and second fuel supply lines 64, 66 is fluidly coupled to the GDI fuel pressure rail 44 such that an increased supply of fuel can be provided to the GDI injectors 62 when high output is required to meet peak engine power or torque requirements.

In one example, first GDI fuel supply line 64 supplies one portion of the GDI injectors 62 (e.g., three), and the second GDI fuel supply line 66 supplies another portion of the GDI injectors 62 (e.g., the remaining three). However, in embodiments with only a single deactivating GDI pump assembly 46, 48, all GDI injectors 62 are supplied by that assembly 46 or 48. The GDI fuel pump assemblies 46, 48 are disposed on the GDI fuel supply lines 64, 66 and are configured to be controlled by ECU 50 (or other controller) to selectively operate between an activated mode and a deactivated mode.

The engine 10 also includes an evaporative emissions control (EVAP) system 68 configured to store and subsequently dispose of fuel vapor emissions for the purpose of preventing fuel vapor from escaping to the atmosphere. The EVAP system 68 is in fluid communication with the fuel tank 52 and the air induction system 12. The EVAP system 68 is designed to collect vapors produced inside an engine's fuel system and then send the vapors through the engine intake manifold 30 into the combustion chamber 24 to be burned as part of the aggregate fuel-air charge. When pressure builds inside the fuel tank 52 as a result of evaporation, fuel vapors are transferred to and stored in a carbon canister (not shown). Subsequently, when engine operating conditions are conducive, ECU 50 opens a valve and vacuum from the intake manifold 30 draws a purge flow of the stored hydrocarbons from the canister to the engine's combustion chamber 24. Thereafter, the carbon canister is regenerated with newly formed fuel vapor, and the cycle can continue.

With continued reference to FIG. 1, the engine 10, equipped with PFI, GDI, and PDI operational capabilities, is configured to operate in various modes to selectively improve vehicle emissions, fuel economy, and/or engine power output. Because each of the PFI, GDI, and PDI fuel systems have different amounts of air and fuel errors, the ECU 50 employs a control strategy to base the fueling error as a function of the split-ratio. This provides a more accurate prediction of what the unlearned data cells should learn. This is particularly important for the purge strategy of EVAP system 68 since the system will cease purge operation if the engine is operating in a condition where the data cell is unlearned.

As noted, the EVAP system 68 will only activate if a data cell ID has been deemed learned. This is because once purge turns on, the LTFTs do not update. Therefore, it is up to the STFT to keep the fuel-air ratio close to its target. If the LTFTs are not learned or pasted accurately, then the STFT will not be able to keep the fuel-air ratio at its target. Accordingly, by pasting long term adaptions into the unlearned cells (thereby making the data cells "learned"), the EVAP system 68 can continue to purge the stored hydrocarbons. Thus, the pasting control strategy described herein is configured to prevent a scenario in which purge must be turned off for further LTFT updating, thereby reducing emissions.

Holistically, the air-fuel adaption strategy uses LTFT and STFT to maintain the desired air-fuel ratio. These trims are calculated from the air-fuel ratio of the exhaust gases measured by the O2 sensor(s) 19 in the exhaust system 16. If the air-fuel ratio indicates too little fuel was injected, the trims will increase the amount of fuel to inject. If the air-fuel ratio indicates too much fuel was injected, the trims will decrease the amount of fuel to inject.

The long term and short term trims work together to compensate for the total error in the system. The STFT is a constantly updating correction based on the measured air-fuel ratio. This correction reacts instantaneously to errors in the measured air-fuel ratio to ensure it always matches the desired air-fuel ratio. The purpose of the LTFT is to save or "learn" the error in the system and be able to apply it proactively and prevent any additional errors from appearing in the air-fuel ratio. If the correct conditions have been met, the LTFT will begin adapting and will use the STFT to update. Any long-term errors that can be seen in the STFT are essentially transferred to the LTFT. This will bring the STFT back closer to a nominal value.

If the process of "transferring" the sustained error from the STFT to the LTFT has completed and the STFT has been brought back to a nominal value, then it can be said that the LTFT has been "learned." This means the ECU 50 now has a good estimation of the error in the fuel system and can proactively compensate for it to ensure the air-fuel ratio stays close to its desired value without having to react to errors. When the LTFT is learned, the STFT is back to a nominal value and can be used to identify and adapt to errors that may be inherent to other fueling sources, such as in the purge system.

Figure 2:
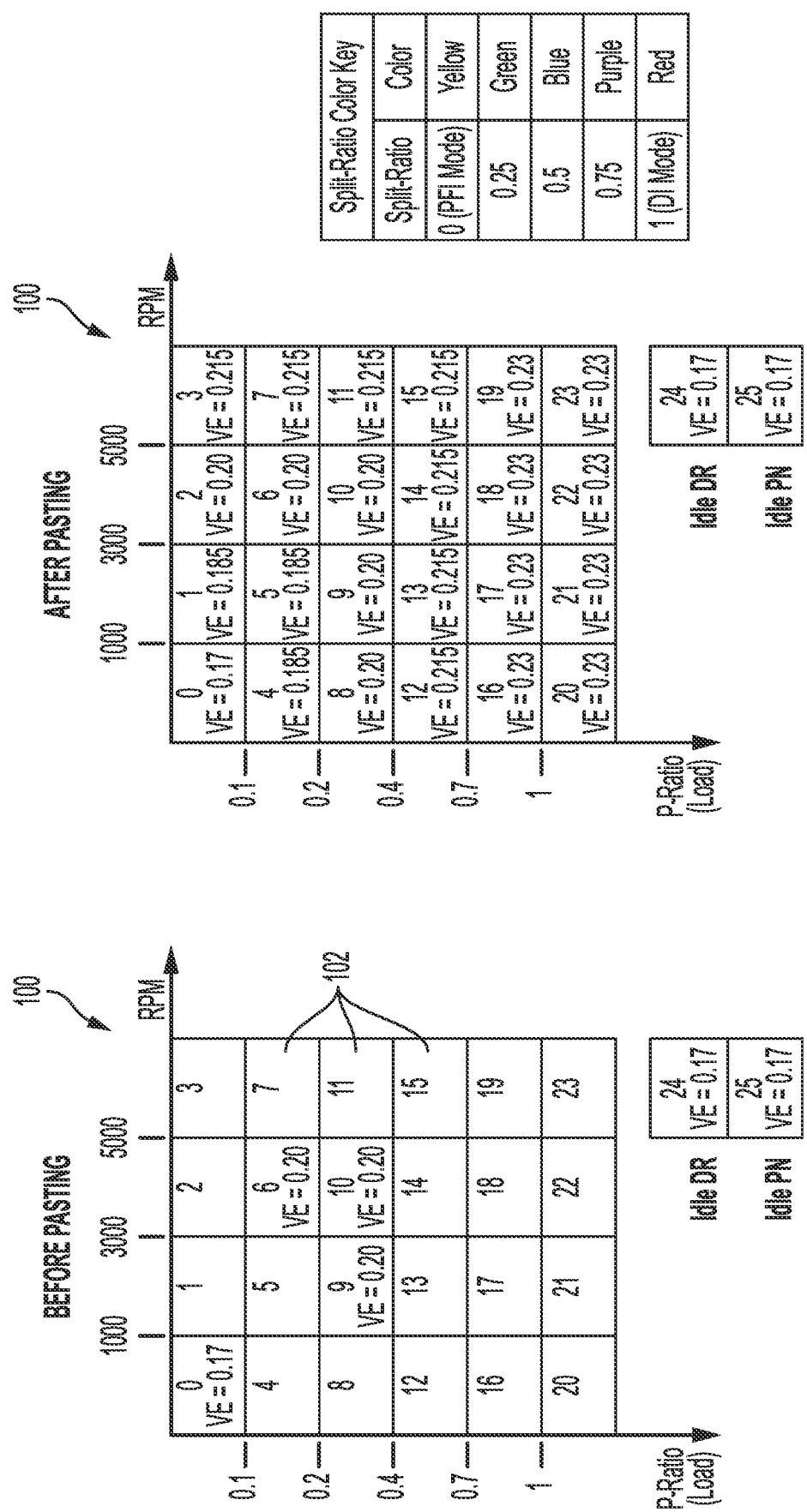
FIG. 2 is an example table indexing fuel split-ratios for engine speed/load operating conditions into data cells in accordance with the principles of the present disclosure.

With reference now to FIG. 2, the pasting control strategy will be described in more detail. In the example embodiment, the pasting control strategy advantageously takes into account both the PFI and GDI fuel system errors and applies them to the unlearned cells based on the split-ratio for those particular data cells. In the illustrated example, the ECU 50 generates a table 100 made up of individual data cells 102 representing fuel system split-ratios at various engine speed/load operating conditions under the PFI mode, the GDI mode, and the PDI mode.

Each data cell 102, which represents an engine operation at a predetermined speed and load. In this way, each cell 102 is defined by calibratable load and RPM breakpoints (e.g., the borders of the cells). This allows the calibrators to adjust how the cell IDs are chosen. Depending on the particular speed and load, the engine will be fueled with a predetermined split-ratio. Data cells 102 having the same split-ratio may be grouped into a Split-Ratio Region, for example, as shown by shaded data cells in FIG. 2. When the system learns the LTFT for a particular cell, it populates that cell with the learned LTFT, for example, as shown in the "before pasting" table 100. Once the system learns a predetermined number of LTFT cells in at least two split-ratio regions, the system can then learn any unlearned cells through a pasting operation ("after pasting" table 100), as described herein in more detail.

In the illustrated example, the table 100 includes twenty-six individual data cells 102 numbered 0-25. Data cells 0, 24, and 25 represent a region of engine operation in PFI only mode (100% PFI, split-ratio=0). In this example, data cell 24 corresponds to an idle Drive-Reverse engine operating condition, and data cell 25 corresponds to an idle Park-Neutral engine operating condition. Data cells 1, 4, and 5 represent a region of engine operation in a first PDI mode (75% PFI, split-ratio=0.25). Data cells 2, 6, and 8-10 represent a region of engine operation in a second PDI mode (50% PFI-GDI, split-ratio=0.5). Data cells 3, 7, and 11-15 represent a region of engine operation in a third PDI mode (25% PFI, split-ratio=0.75). Data cells 16-23 represent a region of engine operation in GDI only mode (100% GDI, split ratio=1.0).

During driving, learned data cells are populated with the learned LTFTs, which can also be expressed as Volumetric Efficiency (VE). This is shown in the "before pasting" table 100 in FIG. 2. As previously noted herein, a data cell is considered "learned" when the sustained error from the STFT is transferred to the LTFT such that the STFT has been brought back to a nominal value. In the example implementation, the control strategy will only paste once fuel trims have been learned for at least two different split-ratios or split-ratio regions. Once this happens, a linear equation is determined for the purpose of modeling fuel trim error as a function of split-ratio. The resulting linear equation is determined as:

$$LTFT = (slope * split\text{-}ratio) + offset$$

From here, the linear equation is used to calculate the values to paste into the unlearned data cells based on their split-ratios, which ensures the fueling error from both the PFI and GDI systems is accounted for. This is shown in the "after pasting" table 100 in FIG. 2.

Figure 3:
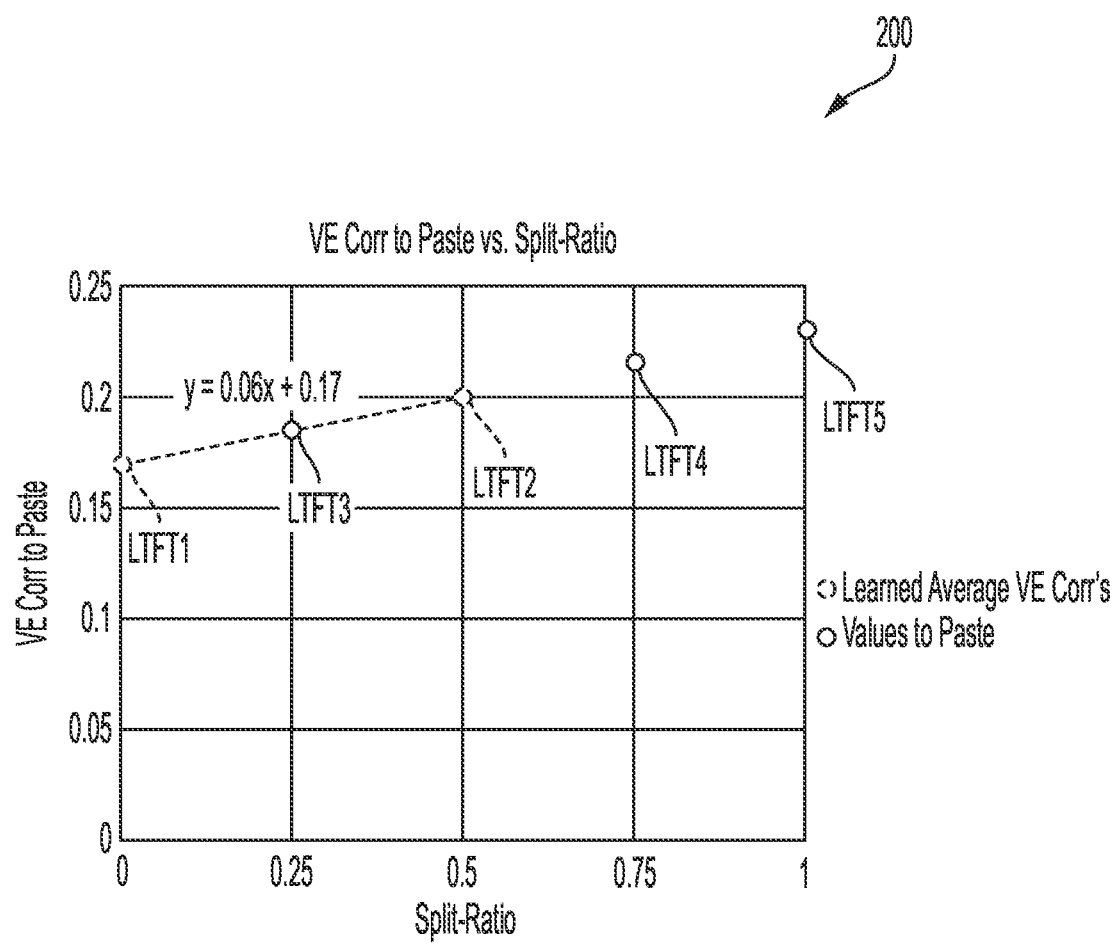
FIG. 3 is an example plot illustrating a volumetric efficiency correction to paste versus split-ratio, in accordance with the principles of the present disclosure.

With additional reference now to FIG. 3, an example PDI VE pasting strategy is described and illustrated by a graph 200 plotting Split-Ratio and VE Correction to Paste. In the example, the LTFT (or VE) is learned in one or more cells in, for example, the PFI only region (as shown in FIG. 2 in the "before pasting" table). Similarly, the LTFT is learned in one or more cells in another split-ratio region, such as the 50-50 split-ratio region in PDI mode. Next, for each split-ratio region, an average LTFT is taken of all the learned LTFT cells. For example, the determined average LTFT of the data cells in the PFI region (e.g., data cells 0, 23, 24) is 0.17 ("LTFT1"), and the determined average LTFT of the data cells in the 50-50 split region (e.g., data cells 2, 6, and 8-10) is 0.20 ("LTFT2"). Using the information below, the ECU 50 is able to determine the slope and offset for the LTFT linear equation, as shown in graph 200.

$$LTFT = (Slope * Split\text{-}Ratio) + offset$$

$$LTFT1 = 0.17, Split\text{-}Ratio1 = 0$$

$$LTFT2 = 0.20, Split\text{-}Ratio2 = 0.5$$

$$Slope = 0.06 \text{ and } Offset = 0.17$$

Once the slope and offset are determined based on the learned data cells, predicted or estimated LTFTs can be pasted into the unlearned cells by inputting their corresponding split-ratios and the calculated slope/offset into the linear equation. For example, as shown in FIG. 3, the LTFT3 for a split-ratio of 0.25 equals 0.185; the LTFT4 for a split-ratio of 0.75 equals 0.215; and the LTFT5 for a split-ratio of 1.0 equals 0.23. As shown in the "after pasting" table of FIG. 2, the system then (i) pastes the LTFT3 into the data cells corresponding to the 0.25 split-ratio region (e.g., cells 1, 4, 5); (ii) pastes the LTFT4 into the data cells in the 0.75 split-ratio region (e.g., cells 3, 7, 11-15); and (iii) pastes the LTFT5 into the data cells in the 1.0 split-ratio region (e.g., cells 16-23). With all the data cells now "learned" the system can ensure certain operations (e.g., purge) are not prevented due to the cells being unlearned.

Figure 4:
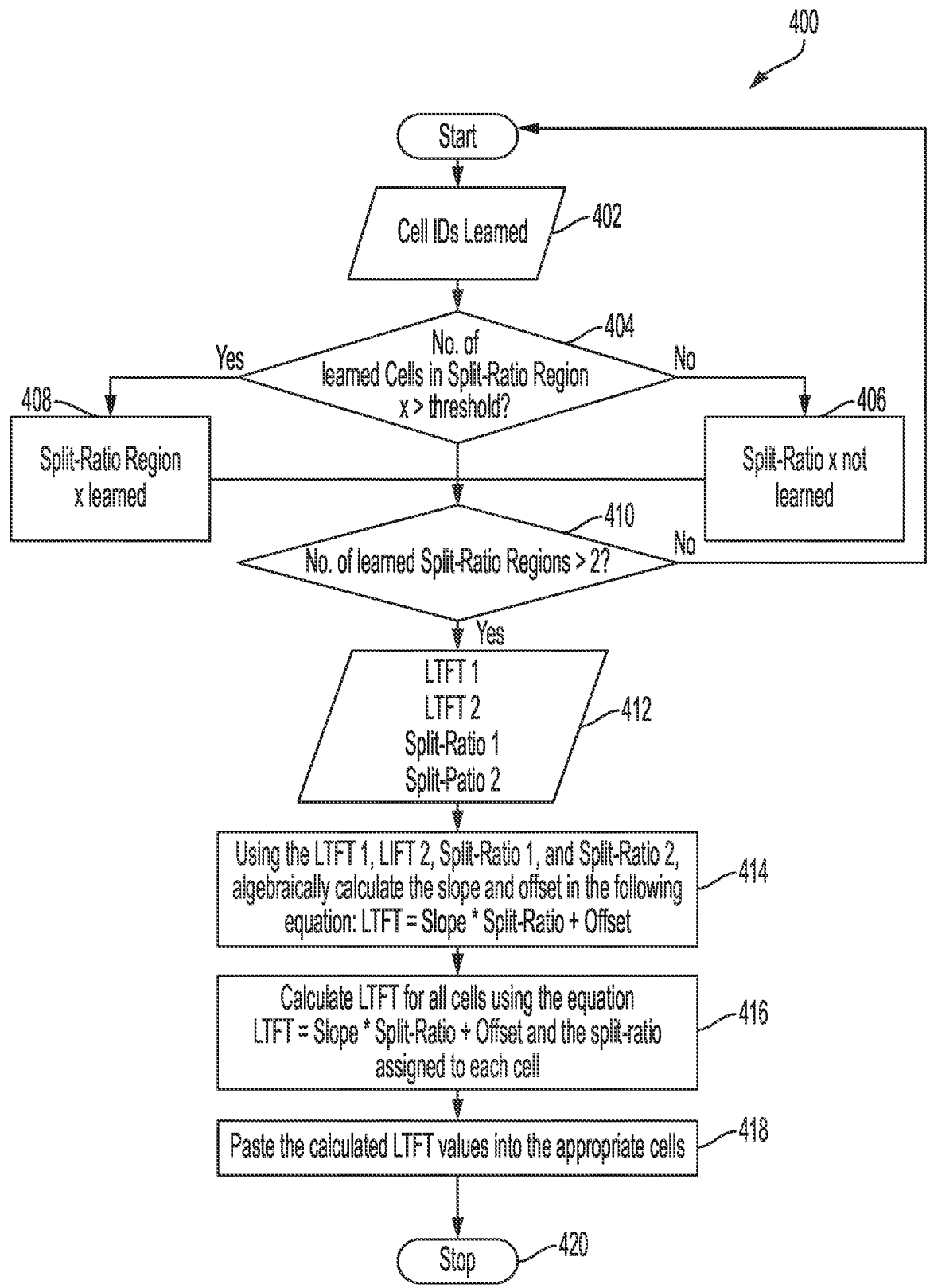
FIG. 4 illustrates example control strategy method for long term fuel trim prediction for the fuel delivery system shown in FIG. 1, in accordance with the principles of the present disclosure.

Referring now to FIG. 4, a flow diagram of an example PDI volumetric efficiency pasting control strategy method 400 according to the principles of the present disclosure is illustrated. At 402, ECU 50 generates and/or populates a table indexing the fuel system split-ratios into correction cells or data cells. Through operation in the PFI, GDI, and/or PDI modes, individual data cells "learn" their LTFT and are populated. At step 404, ECU 50 determines if the number of learned data cells in a given split-ratio region is greater than a predetermined threshold. If no, at step 406, ECU 50 determines the split-ratio for that region is not learned and proceeds to step 410. If yes, at step 408, ECU 50 determines the LTFT for the particular split-ratio region is learned and proceeds to step 410.

At step 410, ECU 50 determines if the number of learned split-ratio regions is greater than two. If no, control returns to the beginning. If yes, based on the learned data cells, ECU 50 determines LTFT1, LTFT2, Split Ratio 1, and Split Ratio 2 (e.g., see FIG. 3) at step 412. It will be appreciated that ECU 50 may determine additional LTFTs and Split Ratios (e.g., LTFTn and Split-Ratio n). At step 414, ECU 50 utilizes the data determined in step 412 to calculate a slope and offset for the linear equation LTFT=(Slope*Split-Ratio)+offset.

At step 416, ECU 50 calculates the LTFT for all data cells in the table utilizing the equation LTFT=(Slope*Split-Ratio)+offset. At step 418, ECU 50 pastes the calculated LTFT values into the appropriate data cells. Control then ends at step 420 and may return to step 404 for another cycle if necessary.

Described herein are systems and methods for a fuel delivery system for an internal combustion engine. The engine and fuel delivery system are configured to selectively operate between a PFI mode, a GDI mode, and PDI mode. The system includes a PDI volumetric efficiency pasting control strategy within the ECU configured to populate unlearned LTFT data cells within a table that indexes split-ratio operating conditions of the PDI system. The strategy utilizes LTFTs from two different split-ratios with learned data cells to create a linear equation. The split-ratios from unlearned cells are then input into the linear equation to determine a predicted/estimated LTFT value to paste into the unlearned cells, thereby resulting in smoother engine operation and reduced emissions.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A port and direct fuel injection (PDI) fuel delivery system for a vehicle having an engine configured to selectively operate between a port fuel injection (PFI) mode, a gasoline direct injection (GDI) mode, and a PDI mode, the system comprising:
   a PFI system including a plurality of PFI injectors configured to supply fuel to the engine during the PFI mode;
   a GDI system including a plurality of GDI injectors configured to supply fuel to the engine during the GDI mode;
   wherein the PFI system and the GDI system are configured to provide various split-ratios of fuel mass injection to the engine based on a particular engine operating condition, the split-ratios being a ratio of fuel mass injection of the PFI injectors to fuel mass injection of the GDI injectors; and
   a controller configured to:
      identify a known first long term fuel trim (LTFT) for a first split-ratio;
      identify a known second LTFT for a second split-ratio;
      generate a linear equation based on the known first and second LTFTs; and
      determine an unknown third LTFT for a third split-ratio by utilizing the linear equation to thereby facilitate reducing fueling errors and emissions.

2. The PDI fuel delivery system of claim 1, wherein the linear equation is LTFT=(Slope*Split-Ratio)+Offset,
   wherein the Slope and the Offset are determined from the known first and second LTFTs and the first and second split-ratios.

3. The PDI fuel delivery system of claim 1, wherein controller includes or is configured to reference a table indexing the various split-ratios of the PDI fuel delivery system for the particular engine operating condition.

4. The PDI fuel delivery system of claim 3, wherein the controller is configured to paste the determined third LTFT into the table as a known third LTFT at the third split-ratio.

5. The PDI fuel delivery system of claim 3, wherein the table includes unknown LTFTs, and wherein the controller is configured to determine the unknown LTFTs in the table and paste the determined LTFTs into the table in corresponding split-ratio data cells.

6. The PDI fuel delivery system of claim 3, wherein the table includes a plurality of regions each corresponding to a particular split-ratio.

7. The PDI fuel delivery system of claim 1, wherein the known first LTFT is a learned LTFT that is established when a sustained error from a first short term fuel trim (STFT) for the first split-ratio is transferred to the first LTFT such that the first STFT is brought back to a nominal value.

8. The PDI fuel delivery system of claim 1, further comprising an EVAP system configured to store and subsequently dispose of fuel vapor emissions, wherein the controller is configured to operate the EVAP system based on the determined third LTFT.

9. A method of controlling a port and direct fuel injection (PDI) fuel delivery system for an engine having a port fuel injection (PFI) system and a gasoline direct injection (GDI) system, the engine configured to selectively operate between a PFI mode, a GDI mode, and a PDI mode, the method comprising:
   identifying, via a vehicle controller, a known first long term fuel trim (LTFT) for a first split-ratio;
   identifying, via the vehicle controller, a known second LTFT for a second split-ratio;
   generating, via the vehicle controller, a linear equation based on the known first and second LTFTs; and
   determining, via the vehicle controller, an unknown third LTFT for a third split-ratio by utilizing the linear equation to thereby facilitate reducing fueling errors and emissions.

10. The method of claim 9, wherein the linear equation is LTFT=(Slope*Split-Ratio)+Offset,
    wherein the Slope and the Offset are determined from the known first and second LTFTs and the first and second split-ratios.

11. The method of claim 9, further comprising referencing, via the vehicle controller, a table indexing various split-ratios of the PDI fuel delivery system for a particular engine operating condition.

12. The method of claim 11, further comprising pasting, via the vehicle controller, the determined third LTFT into the table as a known third LTFT at the third split-ratio.

13. The method of claim 11, wherein the table includes unknown LTFTs, and further comprising:
    determining, via the vehicle controller, the unknown LTFTs in the table and pasting the determined LTFTs into the table in corresponding split-ratio data cells.

14. The method of claim 11, wherein the table includes a plurality of regions each corresponding to a particular split-ratio.

15. The method of claim 9, wherein the known first LTFT is a learned LTFT that is established when a sustained error from a first short term fuel trim (STFT) for the first split-ratio is transferred to the first LTFT such that the first STFT is brought back to a nominal value.

16. The method of claim 9, wherein the engine includes an EVAP system configured to store and subsequently dispose of fuel vapor emissions, wherein the vehicle controller is configured to operate the EVAP system based on the determined third LTFT.

* * * * *